United States Patent Office 3,228,865
Patented Jan. 11, 1966

---

3,228,865
PROCESS FOR POLYMERIZING TETRAFLUOROETHYLENE
James William Vogh, Commerce, Tex., assignor to The Dow Chemical Company, Midland, Mich., a corporation of Delaware
No Drawing. Filed Nov. 29, 1963, Ser. No. 327,087
3 Claims. (Cl. 204—163)

This invention relates to the polymerization of tetrafluoroethylene and pertains especially to improvements in the vapor phase polymerization of tetrafluoroethylene under the influence of actinic light.

It is known to polymerize tetrafluoroethylene under the influence of ultraviolet light, see J. Chem. Soc. (London), pages 2684–94 (1952).

It has now been discovered that the polymerization of tetrafluoroethylene under the influence of actinic light such as ultraviolet radiations is caused to proceed at a substantially increased rate when vapors of tetrafluoroethylene in admixture with nitrous oxide gas are subjected to the action of actinic light and especially light rich in wave lengths of from about 2500 to 2700 Angstroms.

The nitrous oxide can be used in proportions of from about 2 to about 30 percent by volume or more of the volume of the vapors of the tetrafluoroethylene initially used. The polymerization reaction can be carried out at subatmospheric, atmospheric or superatmospheric pressures, and at temperatures between about 10 and 150 degrees C., preferably at from about 25 to 80 degrees C.

In a preferred practice, the vapors or gaseous tetrafluoroethylene and nitrous oxide are fed in the desired proportions to an evacuated reaction vessel, wherein the gases are exposed or subjected to actinic light rich in ultraviolet rays such as by means of a low pressure mercury vapor electric lamp positioned in the reaction vessel so that the vapors of the mixed gases are subjected to the action of the actinic rays which initiate the polymerization reaction. The reaction may be stopped at any given conversion by eliminating the source of actinic rays. The polymer is recovered in usual ways. The product is a solid white polytetrafluoroethylene similar in its properties to polytetrafluoroethylene produced by known methods, e.g. the polymerization of tetrafluoroethylene in admixture with an organic peroxygen polymerization initiator or catalyst.

The actinic light source may be either placed in direct contact with the reactant gases or it may be positioned in a glass or quartz well or adjacent to a transparent glass or quartz window in the reaction vessel.

The following example illustrates ways in which the principle of the invention has been applied, but is not to be construed as limiting its scope.

EXAMPLE 1

A low pressure polymerization reactor was constructed by sealing a 30 watt mercury vapor, General Electric Company, electric lamp bulb 87 centimeters long in a concentric glass tube by means of O rings and sealing wax so that a mid-portion of the mercury vapor bulb 70 centimeters long was surrounded by the glass tube and the annular space between the bulb and the glass tube was a reaction zone. The mercury vapor lamp emitted light principally of wave lengths of 2537 Angstroms. The volume of the reactor was 1940 ml.

In each of a series of experiments, the reaction space was evacuated, then was filled with vapors of tetrafluoroethylene or with a mixture of gaseous tetrafluoroethylene and nitrous oxide ($N_2O$), in proportions as stated in the following table, to an absolute pressure of about 539–700 mm. of mercury. The mercury lamp was turned on, and the polymerization reaction was allowed to proceed to virtual completion with pressure readings taken at sufficient intervals to prepare a curve of conversion to polymer versus time. The reaction rate at which tetrafluoroethylene was consumed to form polymer was calculated for various pressures of nitrous oxide gas, using the rate constant, and the time for polymerizing 50 percent by weight of the tetrafluoroethylene was recorded. At the completion of the experiments, samples were obtained and analyzed. Table I identifies the experiments and gives the initial pressure of the $C_2F_4$ and the $N_2O$ gases in the reactor expressed as mm. of Hg absolute pressure, respectively. The table also gives the rate of change in the pressure of the polytetrafluoroethylene expressed as mm. of mercury per minute, and the time in minutes to polymerize 50 percent by weight of the monomeric tetrafluoroethylene under the conditions employed. The rate of change in pressure of $C_2F_4$ is a measure of the rate of formation of polymer.

Table I

| Run No. | Initial Pressure | | Pressure Change Rate, mm. Hg/Min. | Time to Polymerize 50 percent of $C_2F_4$ Min. |
|---|---|---|---|---|
| | $C_2F_4$ mm. Hg | $N_2O$ mm. Hg | | |
| 1 | 539 | 0 | 1.86 | 160 |
| 2 | 543 | 9 | 2.90 | 120 |
| 3 | 541 | 37 | 5.19 | 72 |
| 4 | 549 | 151 | 5.80 | 60 |

The polytetrafluoroethylene obtained in the experiments was a white solid material having physical properties identical with polytetrafluoroethylene produced by usual methods, e.g. by polymerization in aqueous suspension or emulsion using heat and/or peroxygen catalysts.

I claim:

1. In a process for polymerizing tetrafluoroethylene, the improvement which consists in subjecting vapors of tetrafluoroethylene in admixture with nitrous oxide to the action of actinic light.

2. A process for polymerizing tetrafluoroethylene which comprises subjecting vapors of tetrafluoroethylene in admixture with nitrous oxide to the action of actinic light, the vapor pressure of said nitrous oxide being between about 2 and about 30 percent of the vapor pressure of said tetrafluoroethylene.

3. A process as claimed in claim 2 wherein the actinic light is rich in light of wave lengths of from about 2500 to 2700 Angstroms.

References Cited by the Examiner

FOREIGN PATENTS 939,096  10/1963  Great Britain.

OTHER REFERENCES

J. Chem. Soc. (London), pp. 2684–94 (1952).

MURRAY TILLMAN, *Primary Examiner.*